US008359394B2

(12) United States Patent
Li et al.

(10) Patent No.: US 8,359,394 B2
(45) Date of Patent: Jan. 22, 2013

(54) TEARING AND CONFORMAL TRANSFORMATION HUMAN INTERACTIVE PROOF

(75) Inventors: Weisheng Li, Bothell, WA (US); Bin Benjamin Zhu, Edina, MN (US); Hai Xin, Beijing (CN); Ning Xu, Changzhou (CN); Jia Liu, Beijing (CN)

(73) Assignee: Microsoft Corp., Redmond, WA (US)

(*) Notice: Subject to any disclaimer, the term of this patent is extended or adjusted under 35 U.S.C. 154(b) by 340 days.

(21) Appl. No.: 12/563,977

(22) Filed: Sep. 21, 2009

(65) Prior Publication Data

US 2011/0072498 A1    Mar. 24, 2011

(51) Int. Cl.
G06F 15/16 (2006.01)
G06F 9/44 (2006.01)
H04L 9/32 (2006.01)

(52) U.S. Cl. ............... 709/229; 726/5; 713/170

(58) Field of Classification Search .......... 709/217–219, 709/229; 726/2–6; 713/168–171
See application file for complete search history.

(56) References Cited

U.S. PATENT DOCUMENTS

| 2005/0065802 | A1  | 3/2005  | Rui |
| 2005/0140675 | A1* | 6/2005  | Billingsley et al. ........... 345/440 |
| 2005/0144067 | A1* | 6/2005  | Farahat et al. ................. 705/14 |
| 2005/0229251 | A1* | 10/2005 | Chellapilla et al. ............. 726/23 |
| 2005/0246775 | A1  | 11/2005 | Chellapilla |
| 2008/0066014 | A1  | 3/2008  | Misra |
| 2009/0077629 | A1  | 3/2009  | Douceur |
| 2011/0029902 | A1* | 2/2011  | Bailey ........................ 715/764 |

OTHER PUBLICATIONS

Chellapilla, K., K. Larson, P. Y. Simard, M. Czerwinski, Computers beat humans at single character recognition in reading based human interaction proofs (HIPs), Second Conf. on Email and Anti-Spam, Jul. 2005, Stanford University, California, USA.
Gossweiler, R., M. Kamvar, S. Baluja, What's up CAPTCHA?: A CAPTCHA based on image orientation, Proc. of the 18th Int'l Conf. on World Wide Web, Apr. 2009, pp. 841-850, Madrid, Spain.
Hiroaki, O., Oblivious CAPTCHA: A fifth-factor technology for practical CAPTCHA use, Database Society of Japan Journal, Mar. 2009, vol. 4, No. 2.
Simard, P. Y., R. Szeliski, J. Benaloh, J. Couvreur, I. Calinov, Using character recognition and segmentation to tell computer from humans, 7th Int'l Conf. on Document Analysis and Recognition, Aug. 2003, vol. 2, pp. 418-423, Edinburgh, Scotland, UK.

* cited by examiner

*Primary Examiner* — Yasin Barqadle
(74) *Attorney, Agent, or Firm* — Lyon & Harr, LLP; Katrina A. Lyon

(57) ABSTRACT

The HIP creation technique described herein pertains to a technique for creating a human interactive proof (HIP) by applying tearing and/or a conformal transformation to a string of characters while maintaining readability of text. In one embodiment, the technique tears a character string into two or more pieces and applies conformal transformation to warp the pieces in order to create a HIP. The transformation changes the shape and orientation of the characters but preserves angles of the characters which makes it easy for humans to recognize the characters after the transformation. Other embodiments of the technique create HIPs by applying tearing only to a string of characters, or by applying conformal transformation only to the character string.

16 Claims, 10 Drawing Sheets

TEARING AND CONFORMAL TRANSFORMATION HUMAN INTERACTIVE PROOF

Web services are increasingly becoming part of everyday life. For example, free email accounts are used to send and receive emails; online polls are used to gather opinions; and chat rooms are used to permit online users to socialize. Although these web services are designed for human use, they are being abused by computer programs known as bots. A bot is any type of autonomous software program that operates as an agent for a user or simulates a human activity.

Many types of bots are being maliciously used. For example, bots have been used to register thousands of free email accounts every minute so that they can send thousands of junk emails using these accounts. Bots also have been used to skew on-line poll results, to point users of chat rooms to advertising or even malicious sites, and to collect data on on-line prices in order to undercut competitors' prices.

Presently there exist several Human Interactive Proof (HIP) algorithms that determine whether a computer user is a human or a bot. For example, there are several programs that can generate and grade tests or proofs capable of being passed by humans that are beyond the capabilities of many computer programs. Some pick a random word out of a dictionary, distort it and render it to a user. The user then must identify the word in order to prove that they are a human and not a bot before accessing a desired service.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The HIP creation technique described herein pertains to a technique for creating a human interactive proof (HIP) by using tearing and/or a conformal transformation of a string of characters while maintaining readability of text. In one embodiment, the technique tears character string images into two or more pieces and applies conformal transformation to warp the pieces in order to create a HIP. The conformal transformation changes the shape and orientation of the characters but preserves angles of the characters which makes it easy for humans to recognize the characters after the transformation. Other embodiments of the technique create HIPs by applying tearing only to the string of characters, or by applying conformal transformation only.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the HIP creation technique, reference is made to the accompanying drawings, which form a part thereof, and which show by way of illustration examples by which the HIP creation technique described herein may be practiced. It is to be understood that other embodiments may be utilized and structural changes may be made without departing from the scope of the claimed subject matter.

1.0 HIP Creation Technique.

The following sections provide an introduction to HIP creation in general and an overview of the present HIP creation technique. An exemplary architecture is also provided, as are processes for employing the technique.

1.1 Introduction

Currently, HIPs used in applications that need to generate a large number of tests or proofs daily are almost exclusively text-based. In order to circumvent these text-based HIPs, spammers use sophisticated Optical Character Recognition (OCR) technologies to recognize the distorted characters in HIPs automatically. In many cases, spammers gain efficiency and accuracy in automatic recognition of HIPs by collecting samples to train the OCR software. In the recognition process, the OCR software tries to segment a HIP into individual characters and then recognize each separated character.

Figure 1:
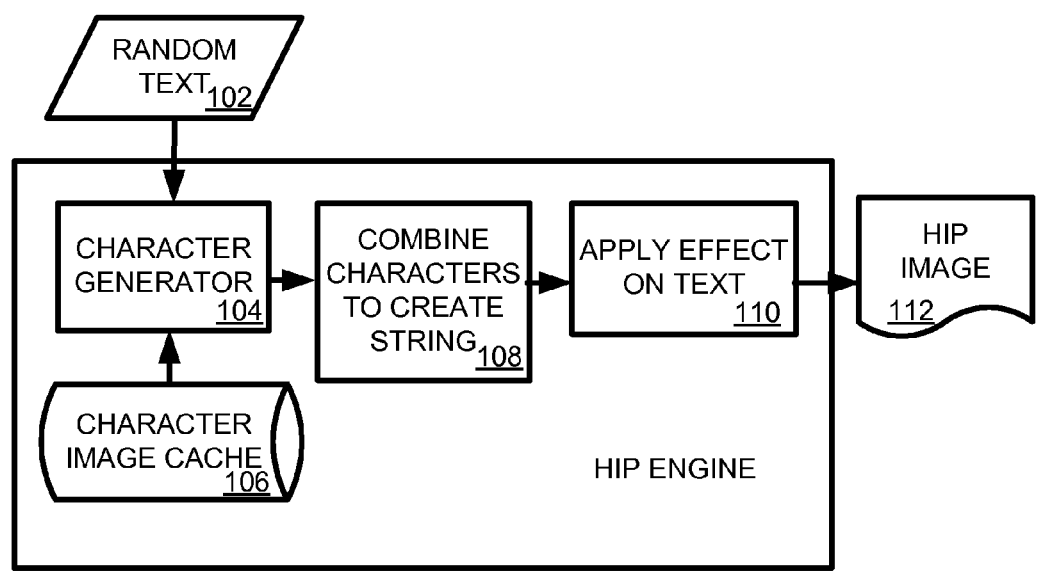
FIG. 1 depicts a high level overview of a system for creating a human interactive proof (HIP).

FIG. 1 provides an overview of one example for generating a Human Interactive Proof (HIP) that is used to distinguish a human from a bot. Typically, in most text-based HIPs, random text 102 is input into a character generator 104 that generates stylized text to be used in creating the test or proof for a prospective user of computer services. Usually the character generator 104 employs a set of different fonts, sizes, font effects (e.g., shadowed, outlined, boldfaced, italicized) stored in a character image cache 106 in generating a character string by combining different characters in a combination module 108. Various text effects 110 are then applied to the combined character string to generate a proof/test 112.

The HIP creation technique described herein is a method of applying special effects to text or character strings to generate a HIP. The HIP generation technique described herein can have the following features:

1) In one embodiment of the HIP creation technique, the technique changes the spreading direction of the characters in a character string from a fixed pattern to dynamic patterns. In order to overcome a HIP, spammers need to figure out the orientation and order of the characters before applying traditional OCR technologies to recognize the HIP image. In one embodiment, this is achieved by applying conformal transformation to the characters of the character string which distorts a HIP image and the spreading directions of characters, yet preserves the angles of the characters of the character string, resulting in high readability by humans.

2) In one embodiment of the HIP creation technique described herein, characters of the character string are torn apart to create a HIP. Humans can easily correlate the torn parts in recognizing each character. However, spammers would need to develop sophisticated technologies to connect the torn parts together before applying the conventional OCR technologies in recognizing the HIPs.

An overview of the present HIP creation technique having been provided, the following paragraphs provide a more detailed description of the character tearing scheme of the technique as well as the conformal transformation that can be applied.

1.2 Character Tearing Schemes

One goal of the tearing schemes employed by the technique is to prevent spammers from easily reconnecting or zipping back the separated character pieces of a character or text string before performing OCR.

1.2.1 Tearing Operations

Figure 2:
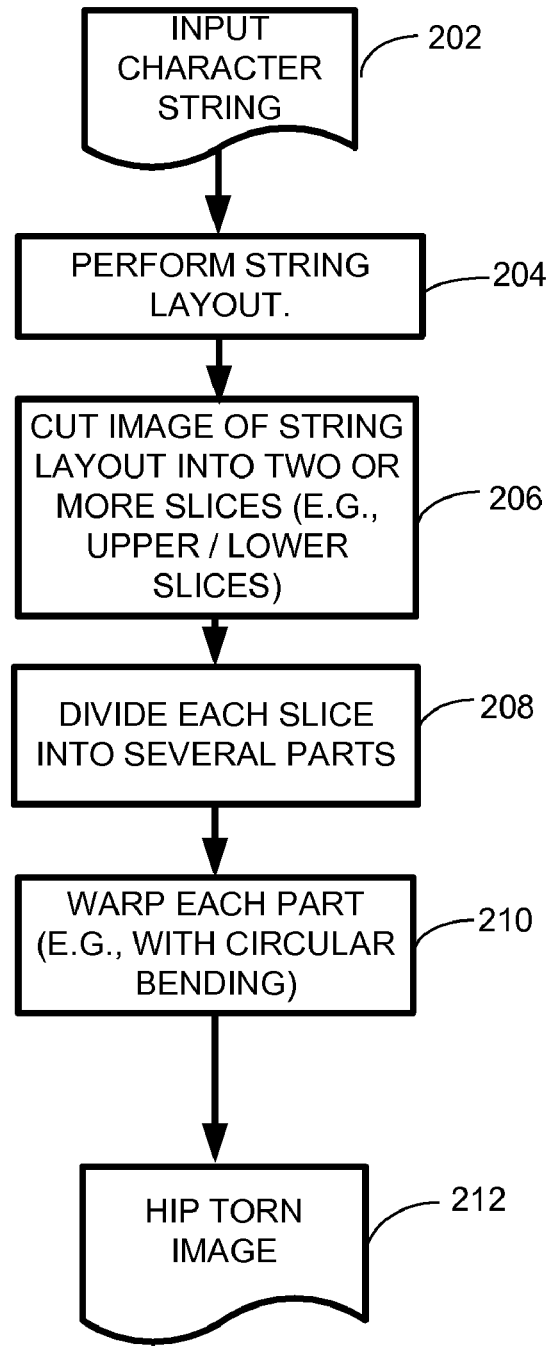
FIG. 2 depicts a high level overview of an exemplary embodiment of the HIP creation technique described herein wherein tearing is employed to create a HIP.

In one embodiment of the technique, tearing is applied to only 1-line character strings, although the same tearing scheme can also be applied to multi-line character or text strings if so desired. It should be noted that while the technique can be applied to a character string previously generated for HIP purposes, the technique can also be applied to any character or text string in order to create a HIP. FIG. 2 depicts how the characters of a character string are formed into a HIP using tearing in one embodiment of the technique. As shown in FIG. 2, a character string is input (block 202). The character string can either be a previously generated HIP based on a character string or a newly generated character string. The character string is laid out in a single line, preferably with neighboring characters touching, as shown in block 204. The laid out character string is then cut into two or more slices, for example an upper and lower slice, as shown in block 206. Each slice is then divided into several parts (block 208). Each part of the several parts can then be warped, for example, by circular bending, as shown in block 210. The output is a HIP with torn characters that is readily readable by humans, but not by bots, as shown in block 212.

The following paragraphs provide additional details with respect to tearing for the technique.

1.2.1.1 Character or Text Layout

In one embodiment, the character or text layout can be the same as any basic HIP algorithm in which characters are laid out in a single line, preferably touching neighboring characters. Alternately, multiple lines of characters or text can be laid out. In one embodiment, characters can be laid out in any pattern such as randomly without any line of characters in the two dimensional space.

1.2.1.2 Image Cut

In one embodiment of the technique, an image of the laid out characters is cut into several parts according to a specific tear pattern, such as, for example, 1×2, 2×1, 1×1. Typically this is done by first cutting a laid out character image into slices para-horizontally and then further dividing each slice into pieces. In this example, each pair indicates the numbers of parts in an upper slice and a lower slice, respectively.

Figure 3:
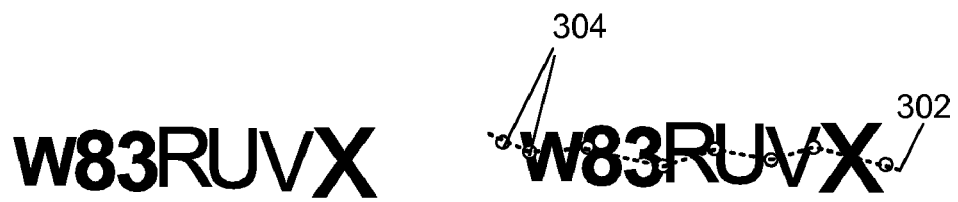
FIG. 3 depicts an example of a cut line and cut points employed in one embodiment of the HIP creation technique that employs tearing.

In one embodiment of the technique, an image of the laid out characters is first split along a roughly horizontal curve 302 defined by a set of cutting points 304, as shown in FIG. 3. In one embodiment, these cutting points 304 traverse around the middles of the characters, and are randomly perturbed in a small offset along the vertical direction, which ensures that each character is cut into two pieces, each about half of the character size for added security. In another embodiment, multiple quasi-horizontal cuts can be applied to an image of the laid out characters, esp. when the image consists of multiple-line character strings or the height of the image is much larger than the height of a character. These cuts can be at any positions but typically ensure that the heights of the resulting slices don't vary too much to ensure a good balance of readability and security.

Figure 4:
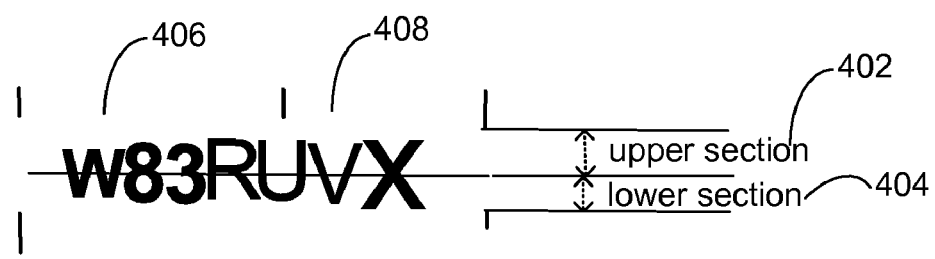
FIG. 4 depicts the parameters used in bending torn portions of characters in one embodiment of the HIP creation technique that employs tearing.

In this embodiment, the upper and lower slices are divided into several parts based on the tear patterns. For example, in a 2×1 pattern the upper slice 402 is further divided into two parts 406, 408 while the lower slice 404 is kept as a whole, as shown in FIG. 4. In one embodiment, this cutting is along the boundary of two neighboring characters to avoid cutting in the middle of a character to make the resulting parts easier to recognize by humans.

1.2.1.2 Circular Bending

In one embodiment of the current HIP creation technique, image parts are further distorted so that pieces from the same characters are separated away from each other to mimic the effect of broken characters. In one embodiment of the technique, the technique applies circular bending to character pieces in the tearing process. Each piece is bent by either circular or bi-circular bending. For example, in one exemplary circular bending implementation, a point is randomly selected, and a whole character piece is bent towards the selected point which acts like the center of a circle, with an appropriate radius. In bi-circular bending, two points are selected, generally on separate sides of the separation line, and a piece is separated into two parts, with each part being bent by circular bending. Bending is typically roughly towards the top or bottom.

Figure 5:
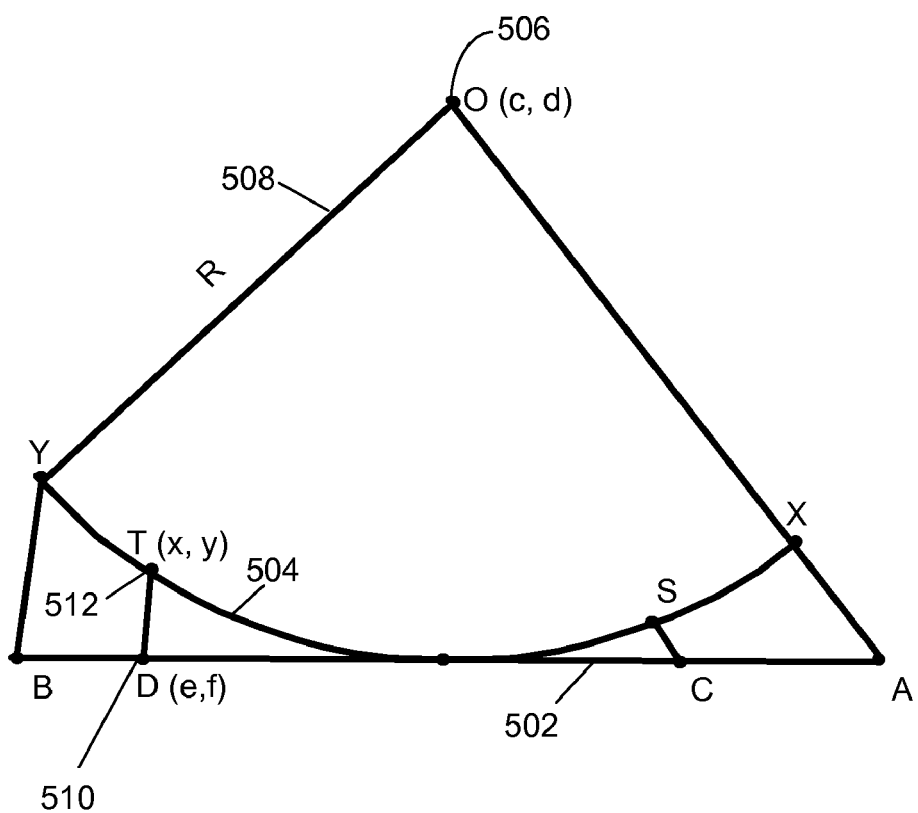
FIG. 5 depicts one example of circular bending that is applied to torn portions of characters of a character string in one embodiment of the HIP creation technique that employs tearing.

One example of circular bending is shown in FIG. 5. In this figure, a straight line BDCA 502 is bent to a curve YTSX 504 which is part of a circle with O 506 as its center.

Suppose that the center O 506 is at (c, d), and the radius of the circle is R 508. Assume a point D 510 at (e, f) is on the line BA, then the point T 512 corresponding to D after bending is at (x, y) where:

$$R = f - d$$
$$\partial = \frac{e - c}{R}$$
$$x = c + R * \sin(\theta)$$
$$y = c + R * \cos(\theta)$$

Besides circular bending other bending methods such as the image warping methods described in the book Digital Image Warping by George Wolberg (IEEE Computer Society Press, Los Alamitos, Calif., 1990) can be implemented. These methods may also be combined. The combination can be of different patterns, such as applied sequentially, or applied at different parts or different portions of a part.

The HIP creation technique described herein may also adjust location of a piece to ensure that there is no overlapping for any two pieces after bending. This can be simply done by a translation along certain directions, typically away from the overlapping part or parts.

During the above bending and adjustment of locations of image pieces, the technique in one embodiment may ensure that the relative separation of two originally connected pieces along the cutting line is roughly proportional to the relative separation along the direction perpendicular to the cutting line so that if two points that touch before bending have a short perpendicular separation after bending, they have short separation along the cutting line too. This can be achieved in one embodiment by applying a bending operation to both top and bottom unfinished parts. For example, for the 2×1 case shown in FIG. 4, the first bending operation is to bend the lower part 404 down. When applying this bending operation, it is applied to all the three unfinished parts, 404, 406, and 408. After this bending operation, 406 and 408 are not separated from 404 at all. Then the bending operation can be applied to 406 to bend it up. The lower part that touches the part 406 does not change since bending on the part 406 is done in the previous step. After this bending, the two parts 406 and 406 still have one touching point, and the separated portions of the two parts satisfy the above requirement: the relative displacement along the perpendicular direction is proportional to the distance to the point still touching after bending. The same operation can be applied to bend the part 408. This is to avoid case that a short perpendicular separation distance corresponds to large separation along the cutting line in character pieces after bending, which is very hard for human to recognize.

1.2.1.4 Local Perturbation

For the aforementioned distortion schemes, it may be possible to find a few matching points of two split character pieces and to use a rigid-body model to warp back the two pieces, allowing the unfound matching points to also be zipped back, therefore effectively reversing the tearing operation. To thwart this attack, in one embodiment of the technique, each split character is perturbed from its position so that the above zipping-back scheme may zip back some points while other points are mismatched so that OCR cannot recognize the characters. Note that such perturbation works better in practice for a two-color case (described below) since in a three-color case, all of the matching points of two split pieces can be easily detected.

One simple perturbation is to apply local warping to two split pieces. The drawback of such a scheme is that the additional distortion brought about by the local warping, typically results in worse readability. A better perturbation scheme is to move each split character piece randomly along the perpendicular direction of the character. In practice, each character may mainly be moved randomly towards the split counterpart of the same character, resulting in a slightly better readability than the case where the characters are not perturbed.

1.2.1.5 Color Scheme

As characters are split into pieces, in one embodiment of the present HIP creation technique described herein, the blank space left in a HIP image (e.g., around the character portions) can be filled with a color different from both foreground and background colors, which results in a three color scheme. The filling space can also be a foreground color or a background color in which case a two color scheme results. It is hard to zip back the split character pieces in the latter case, but this case also results in lower readability. The three color schemes have better readability but are weak in security since they indicate all the matching points along a tearing fringe, helping spamming algorithms to zip back the split pieces in order to perform OCR. Local perturbation does not help much in such a case.

1.3 Conformal Transformation

Conformal transformation or nearly conformal transformation can be applied to the character strings, either in conjunction with the tearing process described above, or as a stand-alone implementation, to create a HIP with improved readability. The purpose of applying conformal transformation is to distort a HIP image while preserving or roughly preserving the angles of any crossing lines, as the name of the transformation implies. This angle-preserving distortion ensures that the characters, after applying a conformal transform, are still easily recognized by humans. Conformal transformation achieves the same effect as conventional global warping but with much improved readability. In one embodiment of the current HIP creation technique, a conformal transform is applied to the result after tearing.

Figure 6:
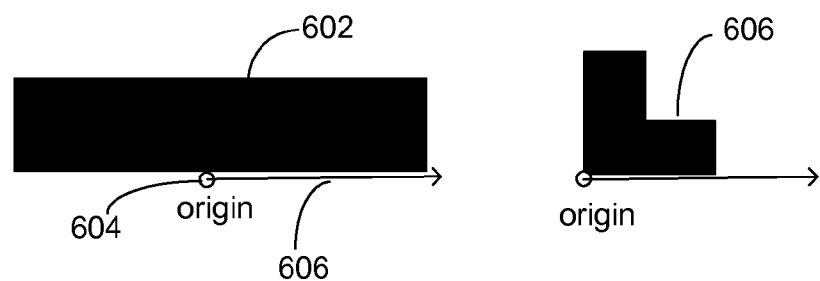
FIG. 6 illustrates the effects of conformal transformation that is applied to a character portion in one embodiment of the HIP creation technique that employs conformal transformation.

One embodiment of the HIP creation technique employs the following conformal transform expressed in complex domain:

$$Z' = Z^{\frac{1}{n}},$$

with $1 \leq n \leq 4$, where Z and Z' are two points in the complex domain. If we use polar coordinate system to represent a point, Z is represented as $(r, \theta)$, and Z' as $(r', \theta')$, where r and r' are radial coordinates, and $\theta$ and $\theta'$ are angular coordinates, then the above conformal transform can be represented as:

$$r' = r^{\frac{1}{n}},$$

and $\theta' = \theta/n$. When applying a conformal transform to an image, an origin (or pole) and a polar axis need to be carefully chosen to achieve the desired effect. The origin is typically selected to be on top or bottom of the characters, but very close to the characters such as a couple of pixels above or below the top or bottom line of characters. The origin is typically chosen at a small random horizontal distance from the center of the region filled with characters. The polar axis in this case can be selected as a horizontal line. FIG. 6 shows on the left an image 602 and the selected origin 604 and selected polar axis 606 before conformal transformation and the resulting image 606 on the right after applying the conformal transform $$Z' = Z^{\frac{1}{2}}.$$

In another embodiment, an origin can be chosen inside the region filled with characters but does not overlap any character, and a polar axis can be selected that does not cross any character to avoid splitting a character into two pieces after conformal transform. This would enlarge the ratio of the size of the character near the origin to the size of the farthest character from the origin. The image after conformal transform can be scaled to a proper size if needed.

1.4 Exemplary Architecture Employing the HIP Creation Technique.

Figure 7:
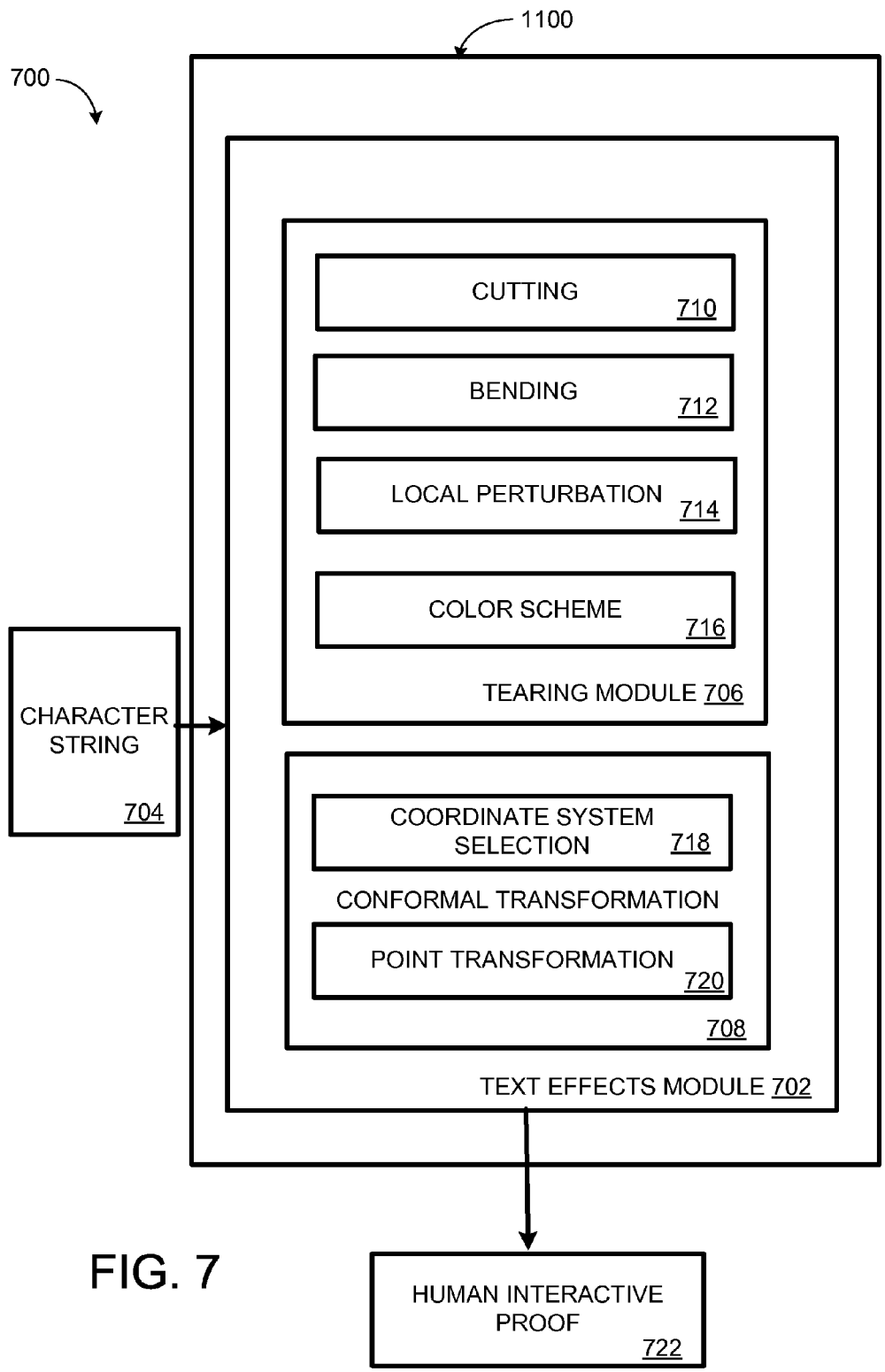
FIG. 7 depicts an exemplary system architecture in which one embodiment of the HIP creation technique can be practiced.

FIG. 7 provides one exemplary architecture 700 in which one embodiment of the HIP creation technique can be practiced in order to create a HIP.

As shown in FIG. 7, the architecture 700 employs a text effect module 702, which typically resides on a general computing device 1100 such as will be discussed in greater detail with respect to FIG. 11. A character string 704 is input into the text effect module 702. This character string 704 can be generated in many conventional ways, and can even be based on a previously generated HIP. The text effect module 702 applies the text effects to the character string 704 as discussed above in order to create a HIP image. For example, the text effect module 702 can employ a tearing sub-module 706, which further can include a cutting sub-module 710, a bending sub-module 712, a local perturbation sub-module 714, and a color filling sub-module 716 that are used to create the torn characters of the character string and to color in the background behind the characters as discussed above. Additionally, a conformal transformation module 708 can be employed in the architecture to apply a conformal transform to the characters of the character string 704, with or without the tearing operation. The conformal transform module 708 can also have a coordinate system selection sub-module 718 to select a origin and a polar axis for the pixel points of the character string and a point transformation module 720 to apply a conformal transform to each points of the character string to distort the characters while preserving or nearly preserving the angles of any crossing lines of the characters. The output of the text effects module 702 is a HIP 722 which is more readable than other HIPs, but more difficult to overcome by applying OCR techniques. The resultant HIP 722 is displayed to a user who then attempts to identify the deformed character string in order to gain access to a desired account or other service.

1.5 Exemplary Processes Employed by the HIP Creation Technique.

Figure 8:
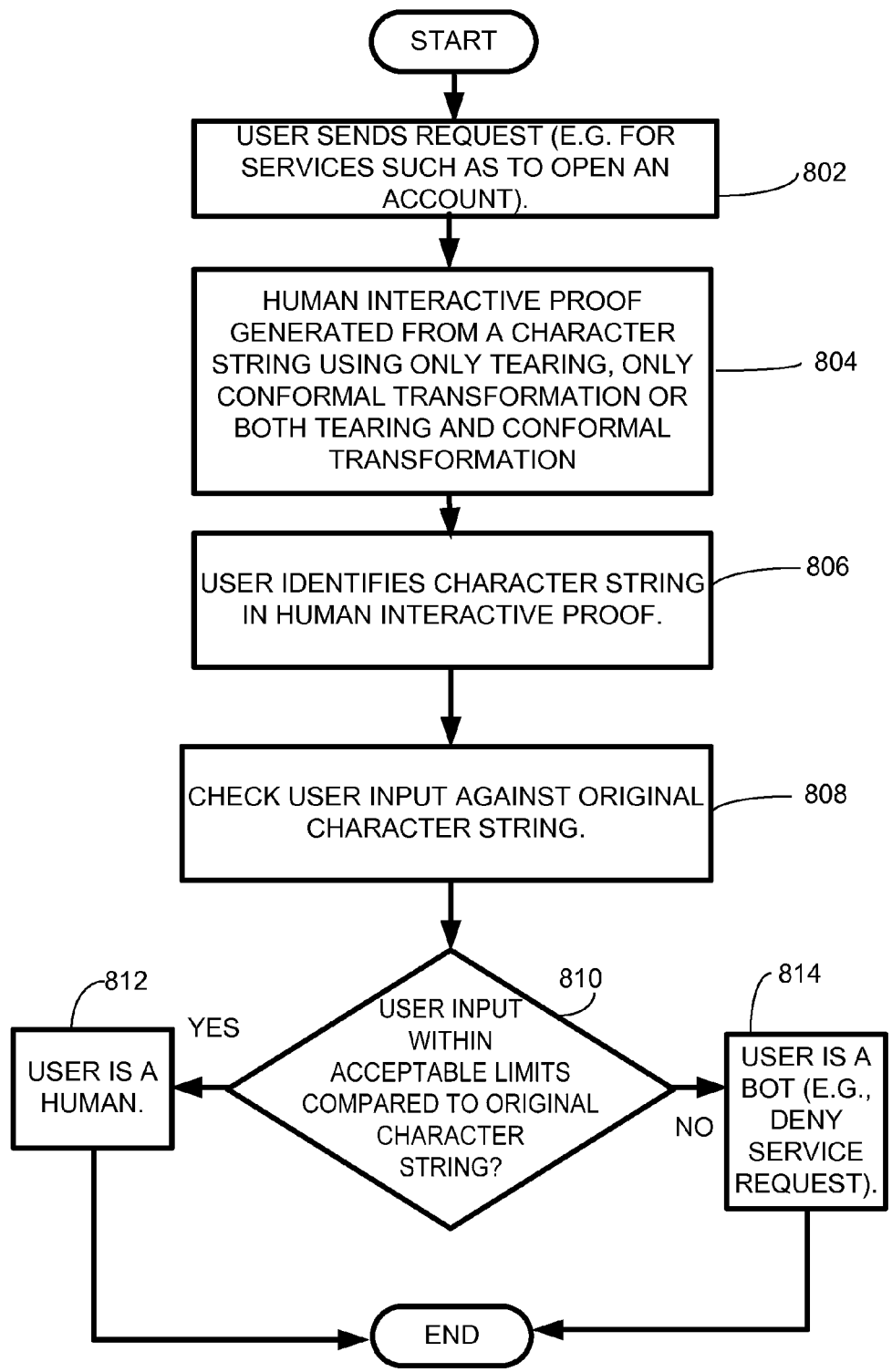
FIG. 8 is a flow diagram depicting an exemplary embodiment of a process for employing the HIP creation technique.

An exemplary process 800 for employing the HIP creation technique described herein is shown in FIG. 8. As shown in FIG. 8, block 802, a user sends a request for services to a provider of services (e.g., for opening a new email account). The service request is typically sent over a network such as the Internet. The user is then provided with a HIP created from a character string created by using tearing, conformal transformation, or both tearing and conformal transformation, as discussed previously (block 804), together with other data such as a registration form to fill. The user identifies the characters in the HIP, and provides them to the provider of services (block 806) along with other information such as a filled form. Once the user's input has been received, the correctness of the characters is checked by comparing the user's input to the character string used to generate the HIP, as shown in block 808. If the input is within acceptable limits compared to ground truth (the original character string), then the user is identified as a human (block 810 and 812). Otherwise, the user is identified as a bot and denied access to the requested services (block 814).

Figure 9:
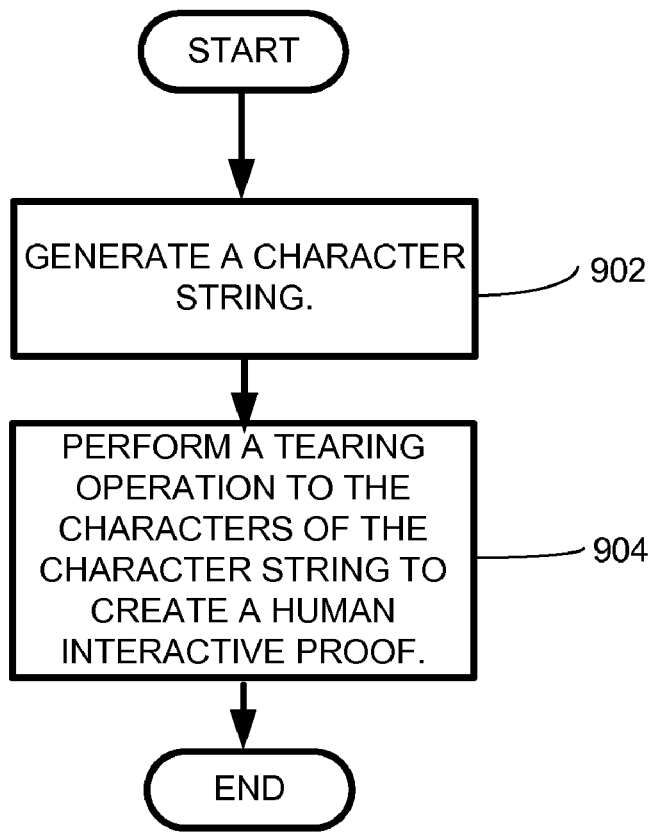
FIG. 9 is a high level flow diagram depicting an exemplary process for creating a HIP by tearing in accordance with the HIP creation technique.

FIG. 9 provides an example of a process for generating a HIP using tearing. As shown in block 902, a character string, such as for example a text string, is generated. A tearing operation is performed on the characters of the character string to create a HIP. For example, the tearing operation as shown in FIG. 2 (e.g., character layout, tearing, bending, local perturbation and coloring) can be used to tear the characters of the character string. It should be noted that not all of the operations shown in FIG. 2 must be used to generate a HIP. For example, only the tearing and bending actions may be used without employing the local perturbations and coloring operations. It should also be noted that other operations, for example, warping, can be applied after or before the tearing operation 904.

Figure 10:
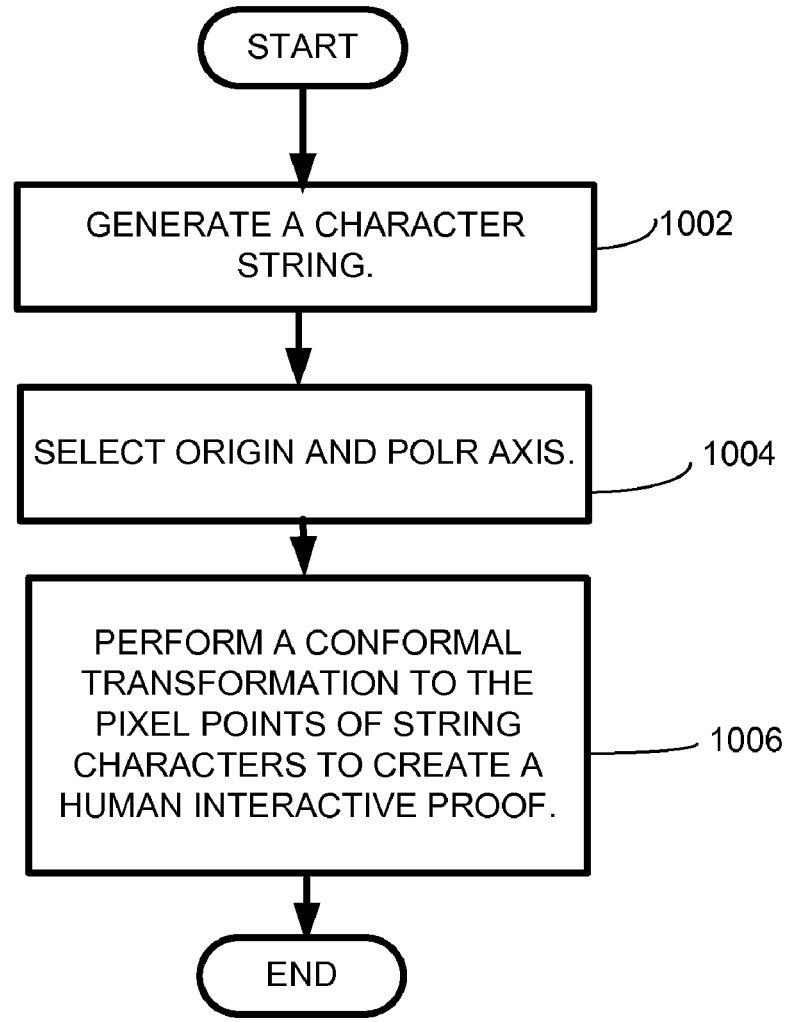
FIG. 10 is yet another flow diagram depicting an exemplary process for creating a HIP by conformal transformation in accordance with the HIP creation technique.

FIG. 10 provides an example of a process for generating a HIP using conformal transformation. As shown in block 1002, a character string, such as for example a text string, is generated. A coordinate system such as a origin and a polar axis is selected, as shown in block 1004. A conformal transformation or near conform transform is then performed to pixel points of the string characters to create a HIP, as shown block 1106. The conformal transformation changes the shape and orientation of the characters but preserves or nearly preserves angles of the characters which makes it easy for humans to recognize the characters after the transformation. It should also be noted that other operations, for example, arranging the characters of the string to touch neighboring characters or tearing operation 904, can be applied after or before the conformal transform's coordinate selection 1004 or after the conformal transform 1006.

2.0 The Computing Environment

The HIP creation technique is designed to operate in a computing environment. The following description is intended to provide a brief, general description of a suitable computing environment in which the HIP creation technique can be implemented. The technique is operational with numerous general purpose or special purpose computing system environments or configurations. Examples of well known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 11:
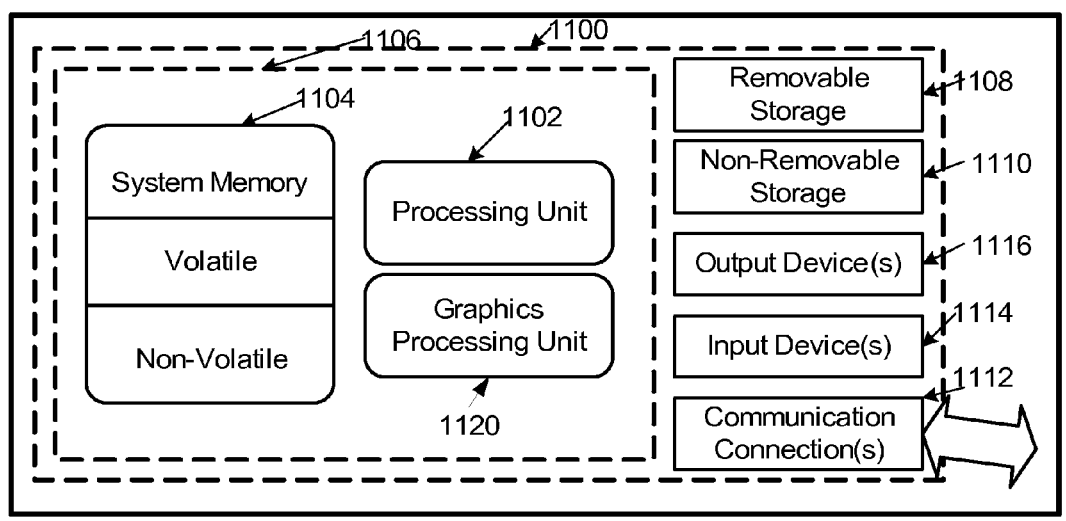
FIG. 11 is a schematic of an exemplary computing device which can be used to practice the HIP creation technique.

FIG. 11 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 11, an exemplary system for implementing the HIP creation technique includes a computing device, such as computing device 1100. In its most basic configuration, computing device 1100 typically includes at least one processing unit 1102 and memory 1104. Depending on the exact configuration and type of computing device, memory 1104 may be volatile (such as RAM), non-volatile (such as ROM, flash memory, etc.) or some combination of the two. This most basic configuration is illustrated in FIG. 11 by dashed line 1106. Additionally, device 1100 may also have additional features/functionality. For example, device 1100 may also include additional storage (removable and/or non-removable) including, but not limited to, magnetic or optical disks or tape. Such additional storage is illustrated in FIG. 11 by removable storage 1108 and non-removable storage 1110. Computer storage media includes volatile and nonvolatile, removable and non-removable media implemented in any method or technology for storage of information such as computer readable instructions, data structures, program modules or other data. Memory 1104, removable storage 1108 and non-removable storage 1110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 1100. Any such computer storage media may be part of device 1100.

Device 1100 also can contain communications connection(s) 1112 that allow the device to communicate with other devices and networks. Communications connection(s) 1112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 1100 may have various input device(s) 1114 such as a keyboard, mouse, pen, camera, touch input device, and so on. Output device(s) 1116 include devices such as a display, speakers, a printer, and so on may also be included. All of these devices are well known in the art and need not be discussed at length here.

The HIP creation technique may be described in the general context of computer-executable instructions, such as program modules, being executed by a computing device. Generally, program modules include routines, programs, objects, components, data structures, and so on, that perform particular tasks or implement particular abstract data types. The HIP creation technique may be practiced in distributed computing environments where tasks are performed by remote processing devices that are linked through a communications network. In a distributed computing environment, program modules may be located in both local and remote computer storage media including memory storage devices.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

Wherefore, what is claimed is:

1. A computer-implemented process for determining whether a computer user is a human or a computer program, comprising:
   using a computer for:
      generating a string of characters to be used as the foreground of a human interactive proof;
      arranging the characters spatially;
      tearing the characters into torn pieces by cutting an image of the arranged string characters into slices and dividing each of the slices into one or more parts, wherein the characters are arranged in a single line and characters are cut into upper and lower slices and wherein the upper and lower slices are based on a roughly horizontal curve defined by a set of cutting points;
      applying a conformal transform to the arranged torn characters, wherein the conformal transformation preserves the angles of any two crossing lines of any character of the string of characters to create a human interactive proof of the string of characters;
      requiring a computer user to identify the characters of the human interactive proof;
      comparing the computer user's identification of the characters of the human interactive proof to the string of characters; and
      determining whether the computer user is a human or a computer program by using the comparison of the computer user's identification of the characters of the human interactive proof to the string of characters.

2. The computer-implemented process of claim 1, further comprising:
   warping each part of the divided slices.

3. The computer-implemented process of claim 2 wherein warping further comprises:
   bending circularly or bi-circularly.

4. The computer-implemented process of claim 2 further comprising:
   further warping several parts simultaneously to ensure each split character separates from its counterpart along the cutting line so as to be roughly proportional to the separation along a line perpendicular to the cutting line after warping to ensure good readability.

5. The computer-implemented process of claim 2 further comprising:
   adjusting the positions of the warped parts so that no part overlaps another part after warping.

6. The computer-implemented process of claim 1, further comprising randomly perturbing at least some of the split characters by a small offset after dividing an image of the characters into parts.

7. The computer-implemented process of claim 2 further comprising filling a background behind the character parts in with a color different from the colors of the parts of the characters.

8. The computer-implemented process of claim 2 further comprising filling a background behind the parts in with the same color as either the foreground or background color of the parts of the characters.

9. A computer-implemented process for determining whether a computer user is a human or a computer program, comprising:
   using a computer for:
      generating a string of characters;
      arranging the characters spatially;
      tearing the characters into torn pieces by cutting an image of the arranged string characters into slices and dividing each of the slices into one or more parts, wherein the characters are arranged in a single line and characters are cut into upper and lower slices and wherein the upper and lower slices are based on a roughly horizontal curve defined by a set of cutting points;
      applying a conformal or nearly conformal transformation to an image of the characters of the string that preserves the angles of any two crossing lines of any character of the string of characters to create a human interactive proof of the string where the characters of the string are displayed in a foreground of the human interactive proof;
      requiring a computer user to identify the characters of the human interactive proof;

comparing the computer user's identification of the characters of the human interactive proof to the string of characters; and determining whether the computer user is a human or a computer program by using the comparison of the computer user's identification of the characters of the human interactive proof to the string of characters.

10. The computer-implemented process of claim 9, wherein applying a conformal or nearly conformal transformation to the image of the characters of the string to create the human interactive proof, further comprises:

selecting a coordinate system with an origin and a polar axis;

applying the conformal or nearly conformal transformation to each point in the coordinate system.

11. The computer-implemented process of claim 10, wherein the origin is selected to overlap no character, and the polar axis is selected to cross no character.

12. The computer-implemented process of claim 9, further comprising: tearing the arranged characters before applying the conformal transformation.

13. The computer-implemented process of claim 12, wherein tearing comprises:

cutting an image of the characters of the text string horizontally into upper and lower slices;

dividing each slice into one or more parts; and warping each part.

14. A system for creating a test to determine whether a user is a person or a bot, comprising:

a general purpose computing device;

a computer program comprising program modules executable by the general purpose computing device, wherein the computing device is directed by the program modules of the computer program to, input a string of characters to be used as the foreground of a human interactive proof;

arrange the characters spatially;

tear the arranged characters by a tearing module comprising a sub-modules to:

cut the characters of the string into slices along a horizontal cutting line;

divide each slice into one or more parts; and warp each part of the divided slices simultaneously to ensure each split character separates from its counterpart along the cutting line;

apply a conformal transform to the arranged torn characters, wherein the conformal transformation preserves the angles of any two crossing lines of any character of the string to create a human interactive proof of the string of characters.

15. The system of claim 14, wherein the module for applying the conformal transform further comprises sub-modules to:

select a coordinate system such as the origin overlaps no character and the polar axis crosses no character;

apply the conformal transform to the pixel points of the arranged torn characters to distort the characters while preserving the angles of any crossing lines of the characters.

16. The system of claim 14 wherein the module for applying the conformal transform further comprises a sub-module to:

apply an approximate conformal transformation to the arranged torn characters.

* * * * *